US012179052B2

(12) United States Patent
Fang

(10) Patent No.: US 12,179,052 B2
(45) Date of Patent: Dec. 31, 2024

(54) FIRE-PROTECTION DETECTING METHOD AND DEVICE, ELECTRONIC DEVICE AND MEDIUM

(71) Applicant: XIAMEN HITHIUM ENERGY STORAGE TECHNOLOGY CO., LTD., Fujian (CN)

(72) Inventor: Yizhong Fang, Fujian (CN)

(73) Assignee: XIAMEN HITHIUM ENERGY STORAGE TECHNOLOGY CO., LTD., Fujian (CN)

( * ) Notice: Subject to any disclaimer, the term of this patent is extended or adjusted under 35 U.S.C. 154(b) by 0 days.

(21) Appl. No.: 18/384,651

(22) Filed: Oct. 27, 2023

(65) Prior Publication Data

US 2024/0139571 A1 May 2, 2024

(30) Foreign Application Priority Data

Oct. 28, 2022 (CN) .......................... 202211336782.7

(51) Int. Cl.
*A62C 37/40* (2006.01)
*A62C 3/16* (2006.01)
(Continued)

(52) U.S. Cl.
CPC ................ *A62C 37/40* (2013.01); *A62C 3/16* (2013.01); *H01M 10/0525* (2013.01); *H01M 50/383* (2021.01)

(58) Field of Classification Search
CPC .......... A62C 3/00–16; A62C 35/00–68; A62C 37/36; A62C 37/40; A62C 37/44; A62C 37/50; H01M 50/383; H01M 10/0525
(Continued)

(56) References Cited

U.S. PATENT DOCUMENTS 6,474,086 B1 * 11/2002 Liu ........................ A62C 37/40
62/506
2017/0361139 A1 * 12/2017 Koreis ..................... A62C 3/16
(Continued)

FOREIGN PATENT DOCUMENTS

CN 106654412 A 5/2017
CN 107469257 A 12/2017
(Continued)

OTHER PUBLICATIONS

International Search Report dated Nov. 10, 2023 received in International Application No. PCT/CN2023/118888.
(Continued)

*Primary Examiner* — Tuongminh N Pham
*Assistant Examiner* — Juan C Barrera
(74) *Attorney, Agent, or Firm* — Scully, Scott, Murphy & Presser, P.C.

(57) ABSTRACT

The present disclosure provides fire-protection detecting method and device, applied to a container-type energy storage system. The method includes: obtaining first sampling data, second sampling data, and third sampling data; determining a first sampling temperature based on the first sampling data, and determining whether a risk event has occurred in the container-type energy storage system based on the first sampling temperature; if it is determined that the risk event has occurred, determining whether the target lithium battery cluster has caught fire based on the second sampling data and/or the third sampling data; if it is determined that the target lithium battery cluster has caught fire, calling the fire-protection system to extinguish fire and sending a first prompt message to the terminal device to prompt that the target lithium battery cluster has caught fire; determining whether to shut down the fire-protection system based on the updated first sampling data.

12 Claims, 5 Drawing Sheets

(51) Int. Cl.
*H01M 10/0525* (2010.01)
*H01M 50/383* (2021.01)

(58) Field of Classification Search
USPC .......................................................... 169/47
See application file for complete search history.

(56) References Cited

U.S. PATENT DOCUMENTS

2021/0241595 A1* 8/2021 Young .................... G08B 17/00
2022/0131199 A1   4/2022 Zheng
2022/0401770 A1* 12/2022 Sandahl ............... H01M 50/383

FOREIGN PATENT DOCUMENTS

| | | | |
|---|---|---|---|
| CN | 108635700 | A | 10/2018 |
| CN | 108785909 | A | 11/2018 |
| CN | 110947120 | A | 4/2020 |
| CN | 111643834 | A | 9/2020 |
| CN | 111915853 | A | 11/2020 |
| CN | 211935268 | U | 11/2020 |
| CN | 112043993 | A | 12/2020 |
| CN | 112070072 | A | 12/2020 |
| CN | 214633484 | U | 11/2021 |
| CN | 113952664 | A | 1/2022 |
| CN | 114447451 | A | 5/2022 |
| CN | 112909360 | B | 6/2022 |
| CN | 114839555 | A | 8/2022 |
| CN | 114913660 | A | 8/2022 |
| CN | 115591162 | A | 1/2023 |
| DE | 202021001906 | U1 | 8/2021 |
| KR | 102178601 | B1 | 11/2020 |
| KR | 102307536 | B1 | 9/2021 |

OTHER PUBLICATIONS

Chinese First Office Action dated Apr. 29, 2023 issued in CN 202211336782.7.
Extended European Search Report dated Mar. 20, 2024 issued in EP 23206610.0.

* cited by examiner

FIRE-PROTECTION DETECTING METHOD AND DEVICE, ELECTRONIC DEVICE AND MEDIUM

CROSS-REFERENCE OF RELATED APPLICATION

The present disclosure claims the benefit of priority to Chinese Application No. 202211336782.7, filed on Oct. 28, 2022, the contents of which are incorporated herein by reference in their entireties for all purposes.

TECHNICAL FIELD

The present disclosure relates to the field of general data processing for fire protection in lithium battery energy storage system, in particular to fire-protection detecting method and device.

BACKGROUND

Lithium battery has advantages such as high efficiency, good dynamic characteristics, long service life, and almost no influence from terrain. Lithium battery is currently widely used in electronic device, electric vehicle, energy storage station, and other fields. Due to the activity of the battery electrodes and the instability of the electrolyte in the energy storage station, during use, if a short circuit and overcharging occurs, or if the lithium battery cluster is hit, squeezed, or punctured, etc., it may result in thermal runaway of the lithium battery cluster, causing chemical reactions and heat release between its internal materials, which will lead to fire or explosion accidents, and seriously affect the safety performance of the energy storage station.

SUMMARY

According to a first aspect, there is provided a fire-protection detecting method, applied to a container-type energy storage system, where the container-type energy storage system includes a fire-protection system, a terminal device, and at least one lithium battery cluster, each lithium battery cluster in the at least one lithium battery cluster corresponds to at least two analysis sensors, the at least two analysis sensors include an aspirating detector and an infrared temperature detector, the at least one lithium battery cluster further corresponds to at least one camera detector, where the method comprises: obtaining first sampling data from the infrared temperature detector, second sampling data from the at least one camera detector, and third sampling data from the aspirating detector; determining a first sampling temperature based on the first sampling data, and determining whether a risk event has occurred in the container-type energy storage system based on the first sampling temperature, where the risk event includes the first sampling temperature being greater than a first preset threshold; if it is determined that the risk event has occurred in the container-type energy storage system, determining whether the target lithium battery cluster has caught fire based on the second sampling data from the at least one camera detector and/or the third sampling data from the aspirating detector; if it is determined that the target lithium battery cluster has caught fire, calling the fire-protection system to extinguish fire and sending a first prompt message to the terminal device to prompt that the target lithium battery cluster has caught fire; continuously obtaining updated first sampling data of the target lithium battery cluster, and determining whether to shut down the fire-protection system based on the updated first sampling data.

According to a second aspect, the embodiment of the present disclosure provides a fire-protection detecting device, applied to a container-type energy storage system, wherein the container-type energy storage system includes a fire-protection system, a terminal device, and at least one lithium battery cluster, each the lithium battery cluster in the at least one lithium battery cluster corresponds to at least two analysis sensors, the at least two analysis sensors comprise an aspirating detector and an infrared temperature detector, the at least one lithium battery cluster further corresponds to at least one camera detector, wherein the device comprises: an obtaining unit: configured to obtain first sampling data from the infrared temperature detector, second sampling data from the at least one camera detector, and third sampling data from the aspirating detector; a determining unit: configured to determine a first sampling temperature based on the first sampling data, and determining whether a risk event has occurred in the container-type energy storage system based on the first sampling temperature, wherein the risk event comprises that the first sampling temperature is greater than a first preset threshold; if it is determined that the risk event has occurred in the container-type energy storage system, determining whether the target lithium battery cluster has caught fire based on the second sampling data from the at least one camera detector and/or the third sampling data from the aspirating detector; a calling unit: configured to call the fire-protection system to extinguish fire if it is determined that the target lithium battery cluster has caught fire, and send a first prompt message to the terminal device to prompt that the target lithium battery cluster has caught fire; the obtaining unit is further configured to continuously obtain updated first sampling data of the target lithium battery cluster, and determine whether to shut down the fire-protection system based on the updated first sampling data.

According to a third aspect, the embodiment of the present disclosure provides an electronic device, comprising a processor, a memory, a communication interface, and one or more programs, where the one or more programs are stored in the memory and configured to be executed by the processor, one or more instructions are suitable to be loaded by the processor and a part or all of the method according to the first aspect is performed.

According to a fourth aspect, the embodiment of the present disclosure provides a computer-readable storage medium, wherein the computer-readable storage medium stores a computer program for electronic data exchange, wherein the computer program causes a computer to execute a part or all of the method according to the first aspect.

BRIEF DESCRIPTION OF THE DRAWINGS

In order to provide a clearer explanation of the embodiments of the present disclosure or the technical solutions in the prior art, a brief introduction will be given to the accompanying drawings required in the description of the embodiments or prior art. Apparently, the accompanying drawings in the following description are only some embodiments of the present disclosure. For those skilled in the art, other accompanying drawings can be obtained based on these drawings without any creative effort.

DETAILED DESCRIPTION

Figure 1:
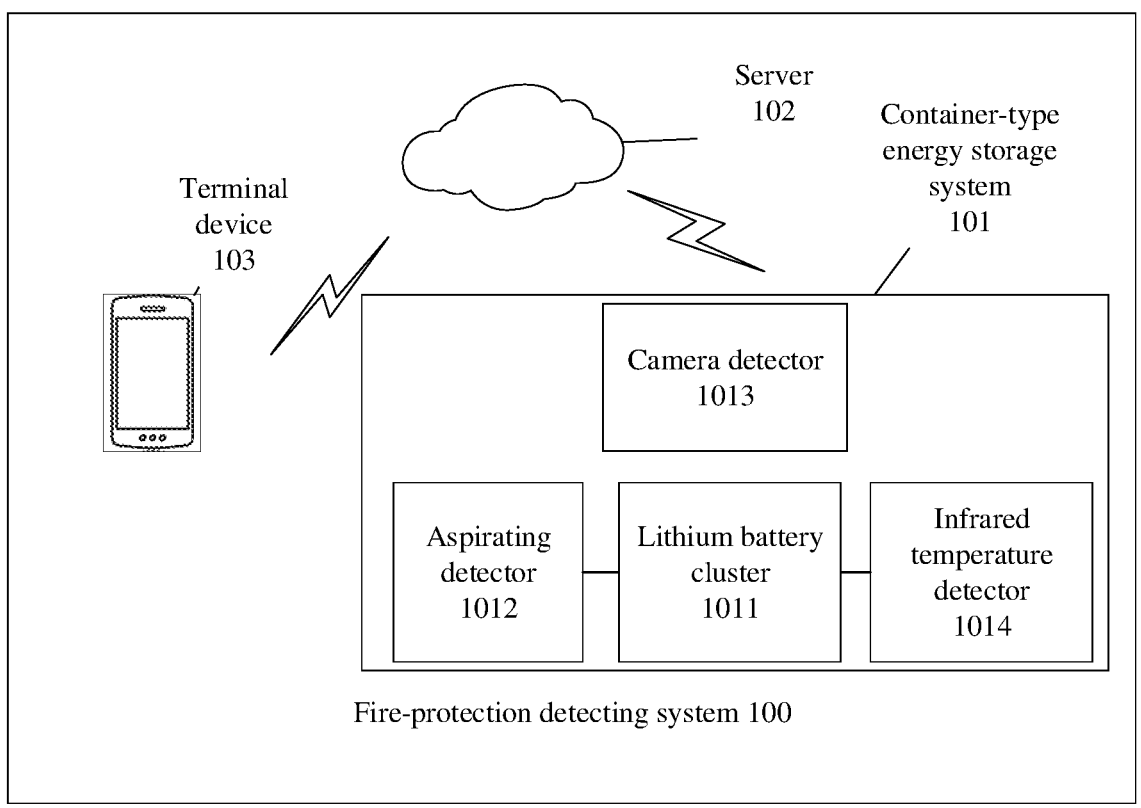
FIG. 1 is a structural schematic diagram of a fire-protection detecting system provided by the embodiment of the present disclosure.

In order to enable those skilled in the art to better understand the solution of the present disclosure, the following will provide a clear and complete description of the technical solution in the embodiments of the present disclosure in conjunction with the accompanying drawings. Obviously, the described embodiments are only a part of the embodiments of the present disclosure, instead of all embodiments. Based on the embodiments in the present disclosure, all other embodiments obtained by those skilled in the art without creative labor fall within the protection scope of the present disclosure.

The terms "first", "second", etc. in the specification and claims of the present disclosure, as well as the accompanying drawings, are used to distinguish different objects, rather than to describe a specific order. In addition, the terms "including" and "having", as well as any variations of them, are intended to cover non-exclusive inclusions. For example, a process, method, system, product, or device that includes a series of steps or units is not limited to the listed steps or units, but optionally includes steps or units that are not listed, or optionally includes other steps or units that are inherent to the process, method, product, or device.

The reference to "embodiments" herein means that specific features, structures, or characteristics described in conjunction with the embodiments can be included in at least one embodiment of the present disclosure. The phrase appearing in various positions in the specification does not necessarily refer to the same embodiment, nor is it an independent or alternative embodiment that is mutually exclusive with other embodiments. Those skilled in the art explicitly and implicitly understand that the embodiment described herein can be combined with other embodiment.

The following describes the embodiments of the present disclosure in conjunction with the accompanying drawings.

At present, the fire-protection solution for the container-type energy storage system still needs to be further improved, and issues such as how to identify abnormal batteries earlier and more accurately, and how to stop fire-protection measures after implementing them still need to be solved.

In response to the above issues, the present disclosure provides fire-protection detecting method and device. By placing monitoring components around or inside lithium-ion batteries and analyzing the collected data using pre-set algorithms, it is possible to effectively monitor whether there are any abnormalities or safety hazards in lithium-ion batteries, which improves the accuracy and efficiency of fire identification in the lithium battery cluster of the container-type energy storage system, thereby improving the fire control capability in this scenario and reducing the potential harm caused by fire. In response to the above issues, the present disclosure proposes processing method and device for a fire-protection detecting system, which will be explained below in conjunction with the attached drawings.

Referring to FIG. 1, FIG. 1 is a schematic structural diagram of a fire-protection detecting system 100 provided by the embodiment of the present disclosure. As shown in FIG. 1, the fire-protection detecting system 100 includes a container-type energy storage system 101, a server 102, and a terminal device 103. The container-type energy storage system 101 further includes at least one lithium battery cluster 1011. One lithium battery cluster 1011 corresponds to at least two detection and analysis sensors: an aspirating detector 1012 and an infrared temperature detector 1014. One container-type energy storage system 101 includes at least one camera detector 1013. The above three types of analysis sensors are used to collect and analyze to obtain the first sampling data, second sampling data, and third sampling data of the lithium battery cluster 1011. The server 102 is used to receive and analyze the first sampling data, second sampling data, and third sampling data of lithium battery cluster 1011, obtain the state of the lithium battery cluster 1011 in container-type energy storage system 101, send an instruction such as activating fire-protection measures to container-type energy storage system 101, and send alarm information to terminal device 103, etc. The terminal device 103 is used to receive alarm information sent by the server 102, etc.

Figure 2:
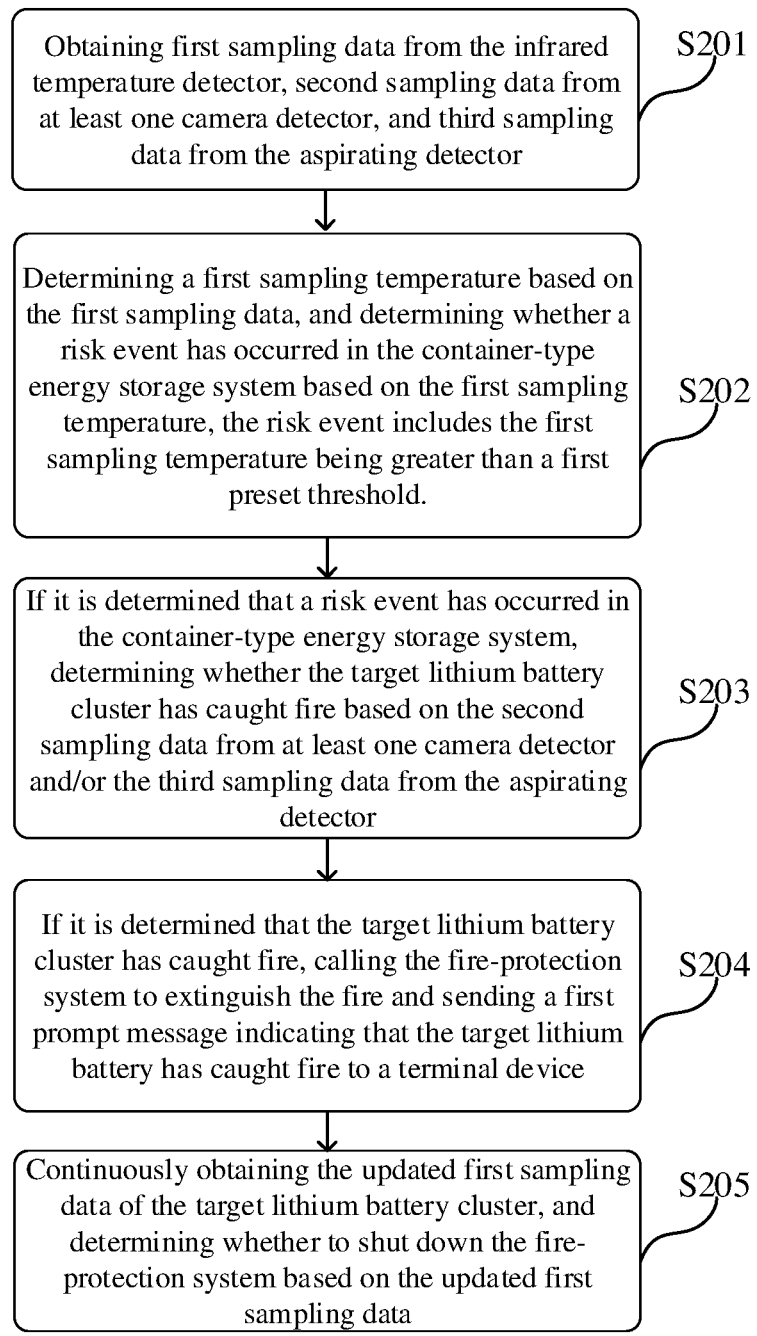
FIG. 2 is a schematic flowchart of a fire-protection detecting method provided by the embodiment of the present disclosure.

Referring to FIG. 2, FIG. 2 is a schematic flowchart of a fire-protection detecting method provided by the embodiment of the present disclosure. As shown in FIG. 2, the method includes steps S201 to S205.

S201: obtaining first sampling data from the infrared temperature detector, second sampling data from at least one camera detector, and third sampling data from the aspirating detector.

Specifically, the infrared temperature detector is used to detect the real-time temperature of target lithium battery cluster. The camera detector is used to detect image data in the container-type energy storage system, which can be smoke, flame, electric spark, etc. identified based on image algorithm appearing in the container-type energy storage system. The aspirating detector is used to detect the gas concentration generated during the combustion of the lithium battery cluster. According to the model of the lithium battery, the detected gas can be methane, ethane, carbon monoxide, hydrogen fluoride, etc.

Figure 3:
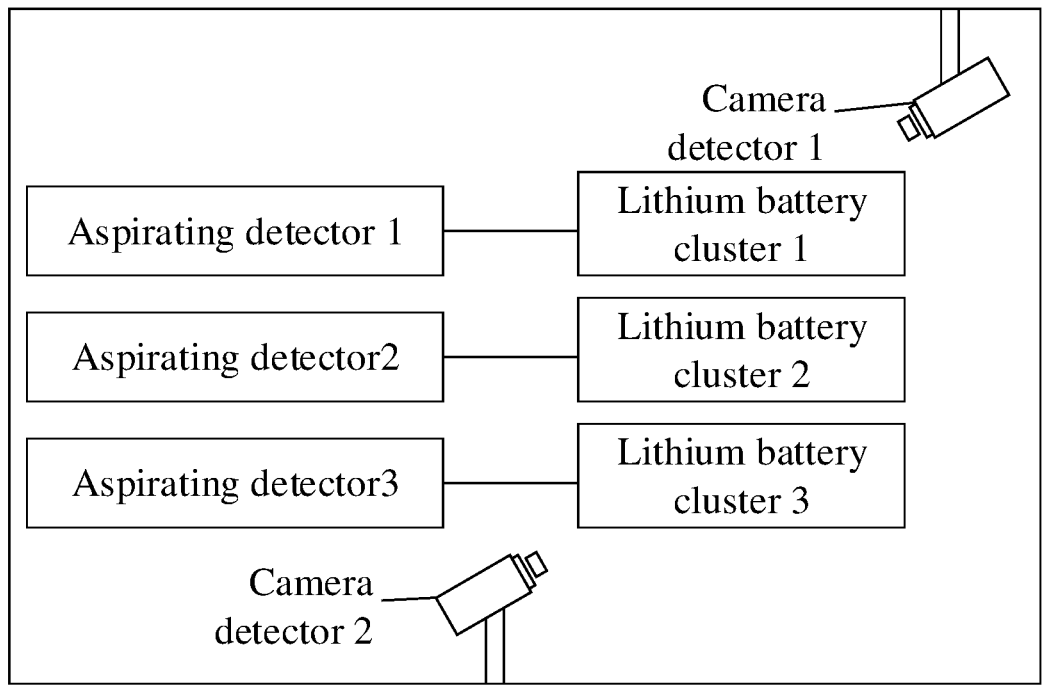
FIG. 3 is a structural schematic diagram of a container-type energy storage system provided by the embodiment of the present disclosure.

For example, referring to FIG. 3, FIG. 3 is a structural schematic diagram of a container-type energy storage system provided by the embodiment of the present disclosure. As shown in the FIG. 3, the container-type energy storage system includes three lithium battery clusters, which are lithium battery cluster 1, lithium battery cluster 2 and lithium battery cluster 3. In practical application scenarios, the number of the lithium battery clusters of the container-type energy storage system should not be limited to three. This is only for example, and the three lithium battery clusters correspond to three aspirating detectors, which are aspirating detector 1, aspirating detector 2 and aspirating detector 3. In practical application scenarios, although the lithium battery clusters are densely installed, insulation materials can be installed between the lithium battery clusters. Each lithium battery cluster is relatively independent, so it is necessary to correspond to independent aspirating detector to detect smoke in local small area. When a fire occurs due to a malfunction of a lithium battery cluster, there is a risk of explosion in the lithium battery cluster. Therefore, the infrared temperature detector is used to detect the temperature of the target lithium battery cluster at a relatively long distance. As shown in FIG. 3, two camera detectors are arranged, which are camera detector 1 and camera detector 2. However, since the lithium battery has a higher volume to energy ratio than the nickel hydrogen battery, which means that under the same volume, the lithium battery has a larger capacity than the nickel hydrogen battery, the overall volume of the container-type energy storage system is not very large. Therefore, in some embodiments, a camera detector can be used. When the overall volume of the container-type energy storage system is large, more camera detectors can be set according to the actual situation. The camera detector can distinguish various lithium battery clusters through image algorithm. If there are risk events such as smoke and flames in the lithium battery cluster, the faulty lithium battery cluster can be determined based on the location of the smoke and flames.

S202: determining a first sampling temperature based on the first sampling data, and determining whether a risk event has occurred in the container-type energy storage system based on the first sampling temperature. The risk event includes the first sampling temperature being greater than a first preset threshold.

Specifically, based on the first sampling temperature, it can be determined whether there is a fire risk in the container-type energy storage system. In the container-type energy storage system, the temperature abnormality of the lithium battery cluster is often risk event that first occurs when the system malfunctions. Therefore, when the first sampling temperature of any target lithium battery cluster in the container-type energy storage system is greater than the first preset threshold, it indicates that a risk event has occurred in the system, and it is possible to cause a fire at any time.

S203: if it is determined that a risk event has occurred in the container-type energy storage system, determining whether the target lithium battery cluster has caught fire based on the second sampling data from at least one camera detector and/or the third sampling data from the aspirating detector.

Specifically, based on the second sampling data from at least one camera detector and/or the third sampling data from the aspirating detector, it can be determined whether smoke, flames or other events have occurred in the target lithium battery cluster, as well as the smoke concentration in the target lithium battery cluster. Based on the above data, it can be determined whether the target lithium battery cluster has caught fire.

In one possible embodiment, determining whether the target lithium battery cluster has caught fire based on the second sampling data from at least one camera detector and/or the third sampling data from the aspirating detector, includes: obtaining a sampling smoke concentration based on the third sampling data from the aspirating detector; obtaining a sampling image based on the second sampling data from the camera detector; if the sampling smoke concentration is greater than a second preset threshold, and/or if at least one of smoke and flames has occurred in the target lithium battery cluster in the sampling image, determining that the target lithium battery cluster corresponding to the aspirating detector has caught fire.

Specifically, the smoke concentration around the target lithium battery cluster can be obtained based on the third sampling data of the aspirating detector. The smoke concentration herein can be the content of any one or more gases such as methane, ethane, carbon monoxide, hydrogen fluoride, etc. If the gas/smoke concentration generated during the combustion of any lithium battery exceeds the second preset threshold, it can be determined that the corresponding lithium battery cluster has caught fire. Alternatively, based on the second sampling data from the camera detector, events such as flames or thick smoke in the target lithium battery cluster can be identified through image algorithm and other methods to determine the specific target lithium battery cluster where the fire occurred.

Figure 4:
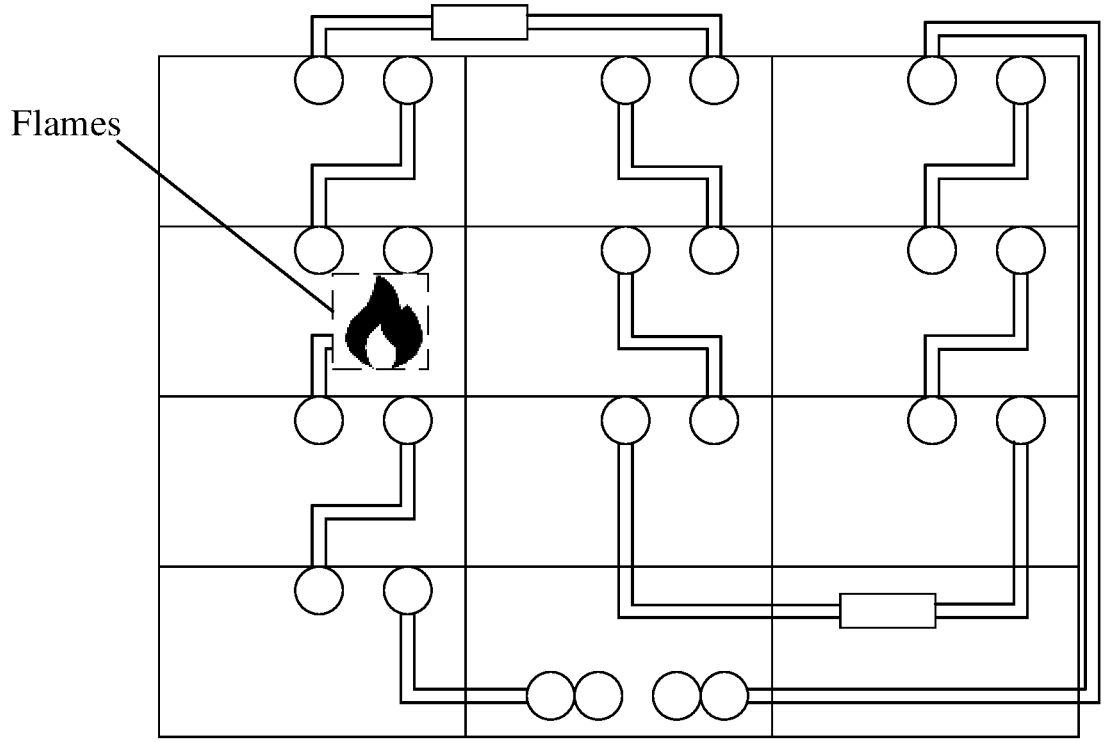
FIG. 4 is a schematic diagram of a sampling image provided by the embodiment of the present disclosure.

For example, referring to FIG. 4, FIG. 4 is a schematic diagram of a sampling image provided by the embodiment of the present disclosure. FIG. 4 shows a lithium battery cluster in the container-type energy storage system, and the lithium battery cluster includes multiple battery modules. The lithium battery cluster is formed by connecting the battery modules and high-voltage boxes in series through copper bars, and fixed on a bracket through structural components. Data testing and analysis on the lithium battery cluster and switch protection for the main circuit are performed through relay, fuse, power resistors and other components inside the high-voltage box. According to the first sampling image, it can be inferred that a risk event such as smoke or flames occurs at any position in the lithium battery cluster, and the fire-protection system is called to extinguish the fire in the lithium battery cluster.

It can be seen that in the embodiment of the present disclosure, the specific lithium battery cluster that has malfunctioned is determined based on the smoke concentration of the lithium battery cluster and/or the sampling image of the lithium battery cluster, which improves the accuracy and efficiency of fire identification in the lithium battery cluster, and thus improves the safety of the container-type energy storage system.

S204: if it is determined that a fire has occurred in the target lithium battery cluster, calling the fire-protection system to extinguish the fire and sending a first prompt message indicating that the target lithium battery has caught fire to a terminal device.

Specifically, a risk event is determined to occur in the container-type energy storage system based on the first sampling data, and the specific target lithium battery cluster with fire and malfunction is determined based on the second sampling data and third sampling data. After that, the server calls the fire-protection system to extinguish the fire. For example, the fire-protection process can include activating a fire alarm device, closing the circuit connection of the lithium battery cluster, and opening the fire-protection valve to pump fire-extinguishing materials onto the target lithium battery cluster. The terminal device here is mobile phone, tablet, computer with wireless transmission and reception functions, on-board intelligent device, other intelligent devices, and other terminal device that can accept and display the prompt message sent by the container-type energy storage system.

S205: continuously obtaining the updated first sampling data of the target lithium battery cluster, and determining whether to shut down the fire-protection system based on the updated first sampling data.

Specifically, the updated first sampling data can be the temperature of the target lithium battery cluster after implementing fire-protection measures for a period of time, or it can be the temperature change rate between any two time points. If the target lithium battery cluster drops to a preset temperature or temperature change rate within a preset time reaches a preset threshold, then it proves that the fire risk of the lithium battery cluster has been ruled out and the fire extinguishing can be stopped. At this time, the fire-protection system is shut down.

In one possible embodiment, determining whether to shut down the fire-protection system based on the updated first sampling data includes: determining the second sampling temperature of the target lithium battery cluster based on the updated first sampling data; calculating the fire extinguishing and cooling rate of the target lithium battery cluster based on a first temperature and a second temperature, where the first temperature is the temperature at which the risk event occurred before calling the fire-protection system, the second temperature is the second sampling temperature after calling the fire-protection system, and the fire extinguishing and cooling rate is temperature change amount of the target lithium battery cluster per unit time; if the second sampling temperature is less than the first preset temperature threshold, and/or if the fire extinguishing and cooling rate of the target lithium battery cluster is greater than the preset fire extinguishing and cooling rate threshold and the temperature does not continue to rise within the preset time range after obtaining the second sampling temperature, shutting down the fire-protection system.

Specifically, after implementing fire extinguishing measures on the target lithium battery cluster, the current temperature or temperature change rate of the target lithium battery cluster can be obtained based on the updated first sampling data of the target lithium battery cluster to determine whether the fire extinguishing is successful and whether the fire extinguishing can be stopped. When the target lithium battery cluster cools to the target temperature, the fire extinguishing can be stopped, or when the cooling rate of the target lithium battery cluster within the preset time range reaches the preset cooling rate and the temperature does not rise again within the preset time range, it also proves that the target lithium battery cluster has stopped burning and the fire extinguishing can be stopped.

For example, when the temperature of the target lithium battery cluster drops to 20 degrees Celsius after the fire-protection system is called to take fire extinguishing measures, meeting the standard for normal operation of the lithium battery cluster, it can be determined that the target lithium battery cluster has stopped burning and calling the fire-protection system can be stopped. Alternatively, after taking fire extinguishing measures, the temperature of the target lithium battery cluster is reduced from 580 degrees Celsius to 40 degrees Celsius within 6 minutes, i.e., the cooling rate per unit time is a decrease of 90 degrees Celsius per minute, meeting the cooling rate standard for fire protection, it can also prove that the target lithium battery cluster has stopped burning. The combustion temperature of the lithium battery may vary from 400 degrees Celsius to 600 degrees Celsius depending on the type of battery and the actual combustion environment. If the temperature of the target lithium battery cluster decreases by 500 degrees Celsius within a preset time, it indicates that the temperature of the lithium battery cluster has dropped to at least 100 degrees Celsius. At this time, the target lithium battery cluster has stopped burning and the temperature does not increase again within the preset time range. Therefore, the calling of the fire-protection system can be stopped to allow the target lithium battery cluster to naturally cool to room temperature.

It can be seen that in the embodiment of the present disclosure, the updated first sampling data is used to determine whether to stop the calling of the fire-protection system to extinguish fire. When the target lithium battery cluster meets a predetermined condition, the calling of the fire-protection system to extinguish fire is stopped, thereby saving the consumption of fire-protection materials, and further improving the reliability and durability of the fire-protection system.

In one possible embodiment, the method for determining the first preset temperature threshold includes: obtaining the current sampling time of the infrared temperature detector; comparing the current sampling time with a first preset time, a second preset time, and a third preset time to obtain a first comparison result, a second comparison result, and a third comparison result, where the first preset time corresponds to a first type preset temperature threshold, the second preset time corresponds to a second type preset temperature threshold, and the third preset time corresponds to a third type preset temperature threshold; setting a first weight value of the first type preset temperature threshold based on the first comparison result, setting a second weight value of the second type preset temperature threshold based on the second comparison result, and setting a third weight value of the third type preset temperature threshold based on the third comparison result; obtaining the first preset temperature threshold by calculating a weighted sum of the first type preset temperature threshold, the second type preset temperature threshold, and the third type preset temperature threshold.

Specifically, the first preset temperature threshold is used to determine whether the target lithium battery cluster has successfully extinguished the fire. If the temperature of the target lithium battery cluster drops to the first preset temperature threshold after calling the fire-protection system, then the target lithium battery cluster has successfully extinguished the fire. The first preset temperature threshold here can be manually set or calculated based on the temperature of the target lithium battery cluster during successful fire protection in history. The current sampling time of the target lithium battery cluster is obtained, and the sampling time is compared with first preset time, second preset time, and third preset time to obtain the corresponding first comparison result, second comparison result, and third comparison result. Based on the first comparison result, the second comparison result, and the third comparison result, a first weight value, a second weight value, and a third weight value are obtained. Based on the first weight value, the second weight value, and the third weight value, the weighted sum of the first preset temperature threshold, the second preset temperature threshold, and the third preset temperature threshold are calculated to obtain the first preset temperature threshold. The first preset temperature threshold here is used to determine whether the target lithium battery cluster has successfully extinguished the fire. The first weight value, the second weight value, and the third weight value here can correspond to different seasons, or different periods of high, medium, and low temperatures in a day, etc. The closer the sampling time is to the time of the high-temperature period, the higher the weight value corresponding to the high-temperature period when calculating the first preset temperature threshold. The closer the sampling time is to the time of the winter, the higher the weight value corresponding to the winter when calculating the first preset temperature threshold.

Furthermore, the first weight value, the second weight value, and the third weight value here can be determined based on the distances between the current sampling time and a first preset time, a second preset time, and a third preset time. The first preset time, the second preset time, and the third preset time can correspond to spring-autumn, summer, and winter, respectively. Due to seasonal changes in environmental temperature, the temperature threshold of lithium battery cluster at the end of a fire is also different. Obviously, the temperature threshold in spring-autumn is lower than that in summer and higher than that in winter. Specifically, for example, the sampling time of the target lithium battery cluster is July 6th, and the distance between July 6th and summer is smaller than that of spring-autumn and winter, therefore the summer weight value of the lithium battery cluster is greater than the spring-autumn weight value of the lithium battery cluster, and the spring-autumn weight value of the lithium battery cluster is greater than the winter weight value of the lithium battery cluster. The final first preset temperature threshold obtained is mainly based on the summer weight value.

In one possible embodiment, a method for determining a preset fire extinguishing and cooling rate threshold includes: obtaining a first historical temperature and a second historical temperature during a historical preset time period, where the first historical temperature and the second historical temperature are a first temperature and a second temperature recorded respectively before and after the successful fire extinguishing of all container-type energy storage systems; obtaining the historical fire extinguishing and cooling rate of the corresponding container-type energy storage system based on the first historical temperature and the second historical temperature. The historical fire extinguishing and cooling rate is the historical temperature change amount of the target lithium battery cluster per unit time; obtaining the expectation minimum value of the historical extinguishing and cooling rate based on the expectation maximization expectation algorithm, and determining the expectation minimum value of the historical extinguishing and cooling rate as the preset fire extinguishing and cooling rate threshold.

Figure 5:
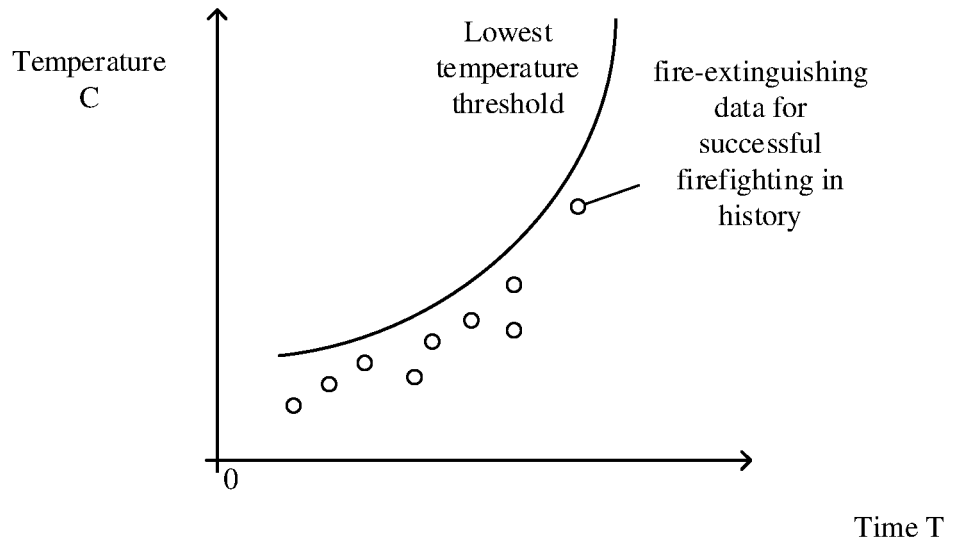
FIG. 5 is a schematic diagram of the principle of the expectation minimum value of a historical fire extinguishing and cooling rate provided by the embodiment of the present disclosure.

Specifically, if the temperature drop rate of the target lithium battery cluster within the target time reaches the preset rate threshold, it can also be considered that the lithium battery cluster has successfully extinguished the fire. The preset rate threshold for the fire extinguishing and cooling rate can be obtained based on the historical fire extinguishing and cooling rate. Based on the historical data of the server, the first historical temperature and the second historical temperature of the lithium battery cluster after successful fire extinguishing can be obtained. The first historical temperature and the second historical temperature here can be the surface temperature of the lithium battery cluster at the beginning of fire extinguishing measure and the surface temperature of the lithium battery cluster after a preset time. The fire extinguishing and cooling rate of the lithium battery cluster which has successfully extinguished the fire can be obtained based on the quotient value of the difference between the first historical temperature and second historical temperature and the elapsed time. The historical fire extinguishing and cooling rate here can be obtained based on the data recorded after the lithium battery cluster successfully extinguished the fire. Alternatively, the historical fire extinguishing and cooling rate can be obtained based on fire extinguishing data of other container-type energy storage systems obtained by the server. Referring to FIG. 5, FIG. 5 is a schematic diagram of the principle of the expectation minimum value of a historical fire extinguishing and cooling rate provided by the embodiment of the present disclosure. The Expectation Maximization Algorithm (EM) is an optimization algorithm that performs maximum likelihood estimation through iteration. The standard calculation framework of the EM algorithm consists of alternating E step (Expectation step) and M step (Maximization step). The convergence of the algorithm can ensure that the iteration approximates at least the local maximum. In the embodiment of the present disclosure, the maximum value of the lithium battery cluster after calling the fire extinguishing system can be estimated based on historical fire extinguishing data as parameters.

It can be seen that in the embodiment of the present disclosure, based on the historical preset temperature threshold and historical fire extinguishing and cooling rate of successful fire extinguishing, it is determined whether the target lithium battery cluster has successfully extinguished the fire and whether the calling of the fire-protection system can be stopped. The judgment standards for normal temperature and fire temperature at different time (including different time of one same day or different seasons of the year) are different. The first preset temperature threshold can be obtained based on different preset temperature thresholds corresponding to different preset time, thereby improving the accuracy of fire detection. In some cases, successful fire extinguishing may also be indicated by rapid cooling of the battery. Combining EM algorithm can effectively determine whether the target lithium battery cluster has successfully extinguished the fire, thereby improving the reliability of fire protection in the container-type energy storage system and further reducing the waste of fire-extinguishing materials.

In one possible embodiment, after shutting down the fire-protection system, the method further includes: continuously obtaining updated first sampling data and determining a third sampling temperature of the target lithium battery cluster after shutting down the fire-protection system based on the updated first sampling data; if the third sampling temperature is less than the first preset temperature threshold and greater than the second preset temperature threshold, determining that the target lithium battery cluster has hardware fault; disconnecting the electrical connection of the target lithium battery cluster and obtaining hardware fault information of the target lithium battery cluster; sending hardware fault information and fault alarm information corresponding to the hardware fault information to the display screen for display.

Specifically, the server is also connected to the display screen. When the fire risk of the target lithium battery cluster is eliminated, but the temperature of the target lithium battery cluster is still higher than the second preset temperature threshold, it indicates that there is still a hardware fault in the target lithium battery cluster, but it has not yet reached the level of causing a fire. Furthermore, when the temperature of the target lithium battery cluster is greater than the second preset temperature threshold but not greater than the first preset temperature threshold, it can also be considered that there is a hardware fault in the target lithium battery cluster, so it needs to close the connection of the target lithium battery cluster and obtain hardware fault information of the target lithium battery cluster. The hardware fault information here can be the operation log of the target lithium battery cluster before the fault, including information such as voltage value, battery level, battery operating time, battery temperature, etc. Fault information and hardware fault alarm will be sent to the display screen for display, and the target user can obtain the above information based on the display screen.

It can be seen that in the embodiment of the present disclosure, the connection of the faulty target lithium battery cluster is immediately closed, and the hardware fault information of the lithium battery cluster is obtained and displayed on the display screen together with the fault alarm, improving the efficiency of fire protection and subsequent maintenance of the container-type energy storage system.

In one possible embodiment, if at least one of the analysis sensors corresponding to the lithium battery cluster malfunctions, the method further includes: obtaining third sampling data from the aspirating detectors of at least two adjacent lithium battery clusters of the target lithium battery cluster and a second sampling data from the camera detector; at least two adjacent lithium battery clusters are located respectively in different directions of the target lithium battery cluster; obtaining the surrounding smoke concentrations of at least two adjacent lithium battery clusters based on the third sampling data of the aspirating detectors of at least two adjacent lithium battery clusters; obtaining a sampling image of the container-type energy storage system based on the second sampling data from the camera detector; determining whether a risk event has occurred in the container-type energy storage system based on sampling image; if a risk event has occurred in the container-type energy storage system, determining whether the surrounding smoke concentration of each adjacent lithium battery cluster in at least two adjacent lithium battery clusters is greater than a third preset threshold; the third preset threshold is smaller than the second preset threshold; if the surrounding smoke concentration of at least one of the two adjacent lithium battery clusters is greater than the third preset threshold, determining that the target lithium battery cluster has caught fire.

Specifically, when the analysis sensor malfunctions, the server will be unable to obtain various sampling data of the target lithium battery cluster. If the hardware of the analysis sensor malfunctions, it is necessary to troubleshoot or replace the device. However, if the target lithium battery cluster malfunctions and causes a fire, this further leads to the failure of the analysis sensor and the inability to collect sampling data for the target lithium battery cluster, resulting in the inability to detect fault, fire, and accurately locate the target lithium battery cluster in a timely manner. At this point, it is necessary to combine the analysis sensor data of adjacent lithium battery clusters to determine whether the analysis sensor of the target lithium battery cluster malfunctions or whether the target lithium battery cluster is on fire due to a fault. If the aspirating detectors of adjacent lithium battery clusters detect that the surrounding smoke concentrations are greater than the third preset threshold, it can be inferred that the target lithium battery cluster malfunctions and is on fire. Due to the diffusion of smoke, the smoke concentrations measured by the aspirating detectors in adjacent lithium battery clusters is relatively higher than that measured by the aspirating detectors in the target lithium battery cluster. Therefore, the third preset threshold needs to be set smaller than the second preset threshold.

Figure 6:
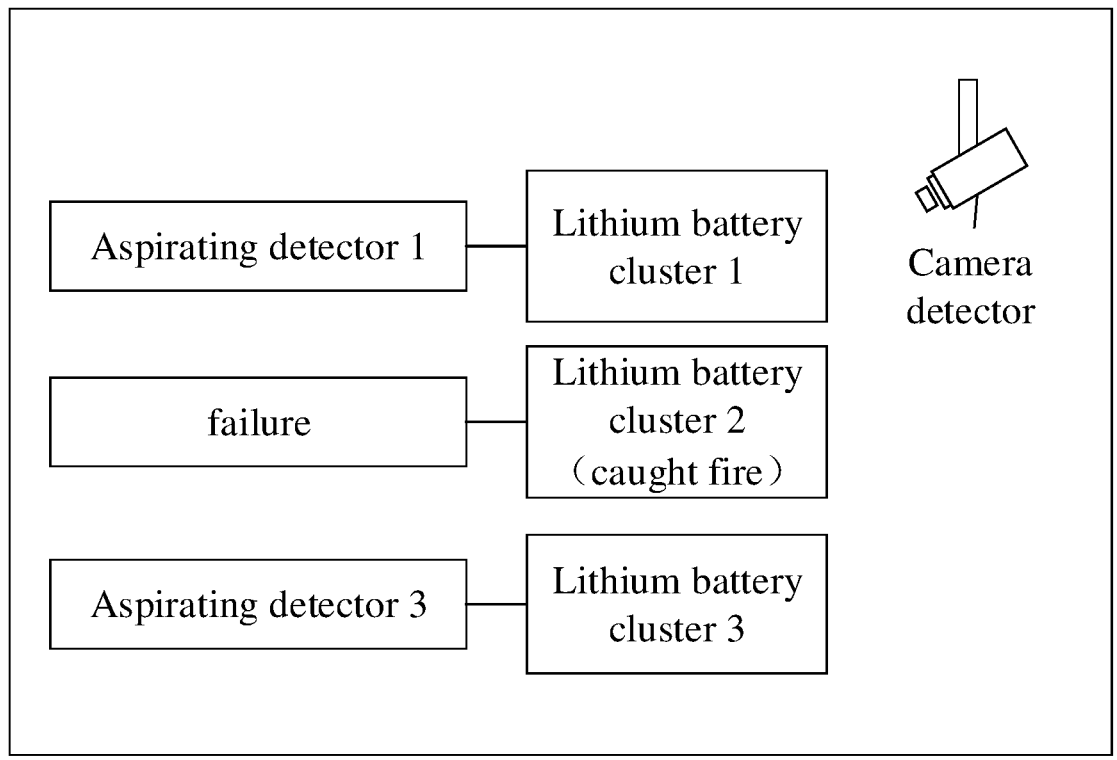
FIG. 6 is a structural schematic diagram of a container-type energy storage system in the event of a fire provided by the embodiment of the present disclosure.

For example, referring to FIG. 6, FIG. 6 is a structural schematic diagram of a container-type energy storage system in the event of a fire provided by the embodiment of the present disclosure. As shown in FIG. 6, the lithium battery cluster 2 in the container-type energy storage system caught fire after a fault occurs, causing the analysis sensor of the lithium battery cluster 2 to be damaged and ineffective. At this point, the current sampling image of the container-type energy storage system is obtained based on the second sampling data of the current camera detector. Furthermore, it can be determined that a risk event (such as flames or smoke) has occurred in the container-type energy storage system based on the sampling image. Furthermore, it can be determined that the lithium battery cluster which has malfunctioned and caught fire is lithium battery cluster 2 based on sampling data of the analysis sensors of the lithium battery clusters 1 and 3 adjacent to the lithium battery cluster 2 being greater than the third preset threshold. Furthermore, fire-protection measures will be implemented for the lithium battery cluster 2.

It can be seen that in the embodiment of the present disclosure, it can be inferred whether the lithium battery cluster with analysis sensor failure has malfunctioned and caught fire based on the data collected by the analysis sensors of adjacent lithium battery clusters, improving the stability and accuracy of fire identification in the container-type energy storage system.

By implementing the method in the embodiment of the present disclosure, the infrared temperature detector is used to determine whether there is a risk event in the container-type energy storage system. The target lithium battery cluster with fire is accurately located based on the sampling data reflecting smoke concentration obtained by the aspirating detector and sampling data reflecting image information obtained by camera detector, improving the accuracy and efficiency of fire identification of lithium battery cluster in the container-type energy storage system. It is determined whether the fire was successfully extinguished based on the sampling data reflecting temperature obtained by the infrared temperature detector, saving the consumption of fire-extinguishing materials. It is determined whether the target lithium battery cluster has successfully extinguished fire and whether the calling of the fire-protection system to extinguish the fire can be stopped based on the historical preset temperature threshold and historical extinguishing and cooling rate for successful fire protection, thereby improving the reliability of fire protection in the container-type energy storage system and reducing the waste of fire-extinguishing materials. It can be inferred and analyzed whether the lithium battery cluster with analysis sensor failure has malfunctioned and caught fire based on the data collected by analysis sensors of adjacent lithium battery clusters, improving the stability and accuracy of fire-protection detecting in the container-type energy storage system.

Figure 7:
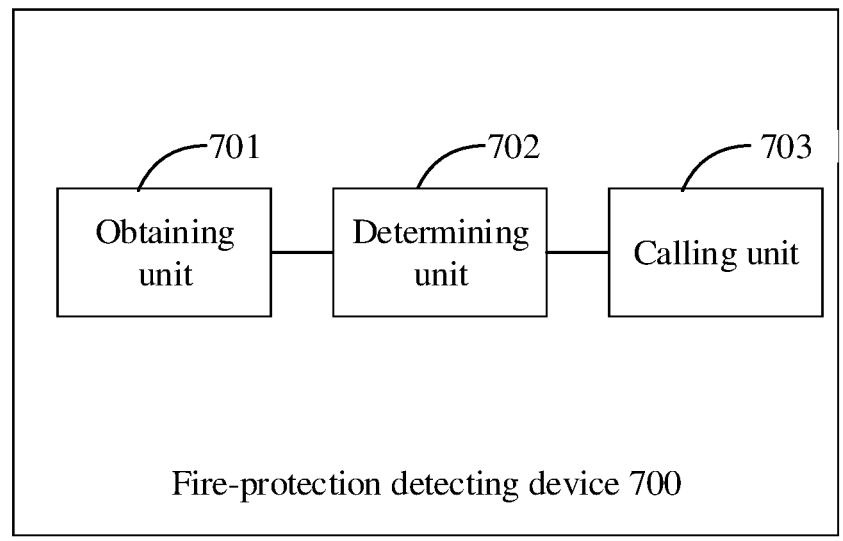
FIG. 7 is a structural schematic diagram of a fire-protection detecting device provided by the embodiment of the present disclosure.

Based on the description of the above configuration method embodiment, the present disclosure also provides a fire-protection detecting device 700, which can be a computer program (including program code) running in a terminal. The fire-protection detecting device 700 can perform the methods shown in FIGS. 1 and 2. Referring to FIG. 7, FIG. 7 is a structural schematic diagram of a fire-protection detecting device provided by the embodiment of the present disclosure. The device includes the following units.

Obtaining unit 701 is configured to obtain first sampling data of an infrared temperature detector, second sampling data of at least one camera detector, and third sampling data of an aspirating detector.

Determining unit 702 is configured to determine a first sampling temperature based on the first sampling data, and to determine whether a risk event has occurred in the container-type energy storage system based on the first sampling temperature. The risk event includes the first sampling temperature being greater than a first preset threshold.

If it is determined that a risk event has occurred in the container-type energy storage system, the determining unit 702 determine whether the target lithium battery cluster has caught fire based on the second sampling data of at least one camera detector and/or the third sampling data of the aspirating detector.

Calling unit 703: If it is determined that the target lithium battery cluster has caught fire, the calling unit 703 calls the fire-protection system to extinguish the fire and send a first prompt message to the terminal device to prompt that the target lithium battery cluster has caught fire.

The obtaining unit 701 continuously obtains the updated first sampling data of the target lithium battery cluster, and the determining unit 702 determines whether to shut down the fire-protection system based on the updated first sampling data.

In one possible embodiment, in determining, by the server, whether the target lithium battery cluster has caught fire based on the first sampling data of the aspirating detector and the third sampling data of the infrared temperature detector, the determining unit 702 is further specifically configured to obtain a sampling smoke concentration based on the third sampling data of the aspirating detector; obtain a sampling image based on the second sampling data of the camera detector; if the sampling smoke concentration is greater than the second preset threshold, and/or if the target lithium battery cluster in the sampling image generates at least one of smoke and/or flames, determine that the target lithium battery cluster corresponding to the aspirating detector has caught fire.

In one possible embodiment, in determining whether to stop calling the fire-protection system to extinguish fire based on the third sampling data, the determining unit 702 is further specifically configured to: determine the second sampling temperature of the target lithium battery cluster based on the updated first sampling data; calculate the fire extinguishing and cooling rate of the target lithium battery cluster based on a first temperature and a second temperature, where the first temperature is a temperature at which the risk event occurred before calling the fire-protection system, the second temperature is a second sampling temperature after calling the fire-protection system, and the fire extinguishing and cooling rate is the temperature change amount of the target lithium battery cluster per unit time; if the second sampling temperature is less than the first preset temperature threshold, and/or if the fire extinguishing and cooling rate of the target lithium battery cluster is greater than the preset fire extinguishing and cooling rate threshold and the temperature does not continue to rise within the preset time range after obtaining the second sampling temperature, shut down the fire-protection system.

In one possible embodiment, before determining whether to stop calling the fire-protection system to extinguish the fire based on whether the current temperature is less than the first preset temperature threshold, the obtaining unit 701 is specifically configured to: obtain the current sampling time of the infrared temperature detector; compare the current sampling time with first preset time, second preset time, and third preset time to obtain a first comparison result, a second comparison result, and a third comparison result, where the first preset time corresponds to a first type preset temperature threshold, the second preset time corresponds to a second type preset temperature threshold, and the third preset time corresponds to a third type preset temperature threshold; set the first weight value of the first type preset temperature threshold based on the first comparison result, set the second weight value of the second type preset temperature threshold based on the second comparison result, and set the third weight value of the third type preset temperature threshold based on the third comparison result; obtain the first preset temperature threshold by calculating a weighted sum of the first type preset temperature threshold, the second type preset temperature threshold, and the third type preset temperature threshold.

In one possible embodiment, in determining whether to achieve fire extinguishing and cooling rate and further whether to stop calling the fire-protection system to extinguish fire based on the first temperature and the second temperature, the determining unit 702 is further specifically configured to: obtain a first historical temperature and a second historical temperature within a predetermined time period, where the first historical temperature and the second historical temperature are a first temperature and a second temperature recorded respectively before and after the historical successful fire extinguishing of all container-type energy storage systems; obtain the historical fire extinguishing and cooling rate of the corresponding container-type energy storage system based on the first historical temperature and the second historical temperature, where the historical fire extinguishing and cooling rate is historical temperature change amount of the target lithium battery cluster per unit time; obtain the expectation minimum value of the historical fire extinguishing and cooling rate based on the expectation maximization algorithm, and determine the expectation minimum value of the historical fire extinguishing and cooling rate as the preset fire extinguishing and cooling rate threshold.

In one possible embodiment, the server is also connected to a display screen. After stopping calling the fire-protection system to extinguish the fire, the obtaining unit 701 is specifically configured to: continuously obtain the updated first sampling data and determine the third sampling temperature of the target lithium battery cluster after shutting down the fire-protection system based on the updated first sampling data; if the third sampling temperature is less than the first preset temperature threshold and greater than the second preset temperature threshold, determine that the target lithium battery cluster has hardware fault; disconnect the electrical connection of the target lithium battery cluster and obtain hardware fault information of the target lithium battery cluster; send hardware fault information and fault alarm information corresponding to the hardware fault information to the display screen for display.

In one possible embodiment, if at least one of the analysis sensors corresponding to the lithium battery cluster malfunctions, the determining unit 702 determines whether the lithium battery cluster has caught fire based on the third sampling data and the second sampling data. The determining unit 702 is also specifically configured to: obtain the third sampling data of the aspirating detectors of at least two adjacent lithium battery clusters of the target lithium battery cluster and the second sampling data of the camera detector, where at least two adjacent lithium battery clusters are located in different directions of the target lithium battery cluster; obtain the surrounding smoke concentration of at least two adjacent lithium battery clusters based on the third sampling data of the aspirating detectors of at least two adjacent lithium battery clusters; obtain a sampling image of the container-type energy storage system based on the second sampling data of the camera detector; determine whether a risk event has occurred in the container-type energy storage system based on sampling images; if a risk event has occurred in the container-type energy storage system, determine whether the surrounding smoke concentration of each adjacent lithium battery cluster in at least two adjacent lithium battery clusters is greater than the third preset threshold, where the third preset threshold is smaller than the second preset threshold; if the surrounding smoke concentration of at least one of the at least two adjacent lithium battery clusters is greater than the third preset threshold, determine that the target lithium battery cluster has caught fire.

It should be noted that the above modules (obtaining unit 701, determining unit 702, and calling unit 703) are used to execute the relevant steps of the above method. For example, obtaining unit 701 is used to implement the relevant content of step S201 and determining unit 702 is used to implement the relevant content of step S202.

Figure 8:
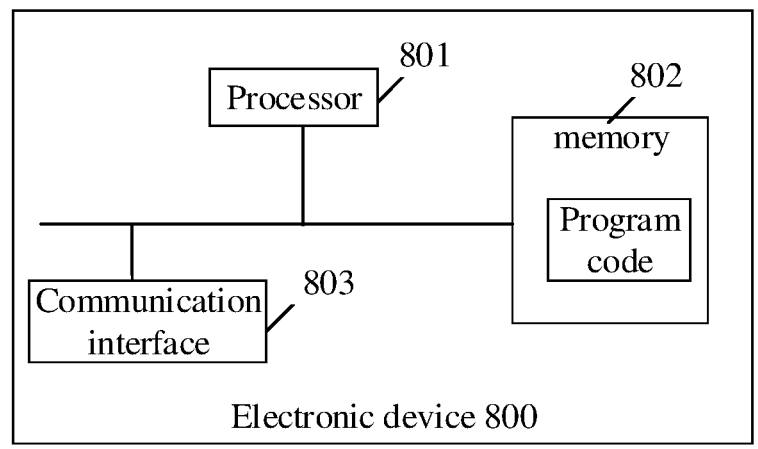
FIG. 8 is a structural schematic diagram of an electronic device provided by the embodiment of the present disclosure.

Based on the description of the above method embodiment and device embodiment, referring to FIG. 8, FIG. 8 is a structural schematic diagram of an electronic device provided by the embodiment of the present disclosure. The electronic device 800 described in the present embodiment, as shown in FIG. 8, includes a processor 801, a memory 802, a communication interface 803, and one or more programs. The processor 801 can be a universal central processing unit (CPU), a microprocessor, application-specific integrated circuit (ASIC), or one or more integrated circuits used to control the execution of the above program. Memory 802 can be a Read Only Memory (ROM) or other types of static storage devices that can store static information and instructions, a random access memory (RAM) or other types of dynamic storage devices that can store information and instructions, or an Electrically Erasable Programmable Read Only Memory (EEPROM), Compact Disc Read-Only Memory (CD-ROM) or other optical disc storage, optical disc storage (including compressed disc, laser disc, optical disc, digital universal disc, Blu-ray disc, etc.), disk storage media or other magnetic storage devices, or any other medium that can be used to carry or store desired program code in the form of instruction or data structure and can be accessed by a computer, but is not limited to this. Memory 802 can exist independently and be connected to processor 801 through a bus. Memory 802 can also be integrated with processor 801. Communication interface 803 is used for communicating with other devices or communication networks, such as Ethernet, Wireless Local Area Networks (WLAN), etc. The above one or more programs are stored in the memory in the form of program code and configured to be executed by the processor. In the embodiment of the present disclosure, the above programs include instructions for executing the following steps: obtaining first sampling data from the infrared temperature detector, second sampling data from at least one camera detector, and third sampling data from the aspirating detector; determining a first sampling temperature based on the first sampling data, and determine whether there is a risk event in the container-type energy storage system based on the first sampling temperature, where risk event includes the first sampling temperature being greater than a first preset threshold; if it is determined that a risk event occurs in the container-type energy storage system, determining whether the target lithium battery cluster has caught fire based on the second sampling data of at least one camera detector and/or the third sampling data of the aspirating detector; if it is determined that the target lithium battery cluster has caught fire, calling a fire-protection system to extinguish the fire and sending a first prompt message to a terminal device to prompt that the target lithium battery cluster has caught fire; continuously obtaining the updated first sampling data of the target lithium battery cluster, and determining whether to shut down the fire-protection system based on the updated first sampling data.

In one possible embodiment, determining whether the target lithium battery cluster has caught fire based on the second sampling data of at least one camera detector and/or the third sampling data of the aspirating detector, includes: obtaining sampling smoke concentration based on the third sampling data of the aspirating detector; obtaining sampling image based on the second sampling data of the camera detector; if the sampling smoke concentration is greater than the second preset threshold, and/or if the target lithium battery cluster in the sampling image generates smoke and/or flames, determining that the target lithium battery cluster corresponding to the aspirating detector has caught fire.

In one possible embodiment, determining whether to shut down the fire-protection system based on the updated first sampling data includes: determining a second sampling temperature of the target lithium battery cluster based on the updated first sampling data; calculating the fire extinguishing and cooling rate of the target lithium battery cluster based on a first temperature and a second temperature, where the first temperature is a temperature at which the risk event occurred before calling the fire-protection system, the second temperature is a second sampling temperature after calling the fire-protection system, and the fire extinguishing cooling rate is temperature change amount of the target lithium battery cluster per unit time; if the second sampling temperature is less than a first preset temperature threshold, and/or if the fire extinguishing and cooling rate of the target lithium battery cluster is greater than a preset fire extinguishing and cooling rate threshold and the temperature does not continue to rise within the preset time range after obtaining the second sampling temperature, shutting down the fire-protection system.

In one possible embodiment, the method for determining the first preset temperature threshold includes: obtaining current sampling time of the infrared temperature detector; comparing the current sampling time with first preset time, second preset time, and third preset time to obtain a first comparison result, a second comparison result, and a third comparison result, where the first preset time corresponds to a first type preset temperature threshold, the second preset time corresponds to a second type preset temperature threshold, and the third preset time corresponds to a third type preset temperature threshold; setting a first weight value of the first type preset temperature threshold based on the first comparison result, setting a second weight value of the second type preset temperature threshold based on the second comparison result, and setting a third weight value of the third type preset temperature threshold based on the third comparison result; obtaining the first preset temperature threshold by calculating a weighted sum of the first type preset temperature threshold, the second type preset temperature threshold, and the third type preset temperature threshold.

In one possible embodiment, a method for determining the preset fire extinguishing and cooling rate threshold includes: obtaining a first historical temperature and a second historical temperature within the historical preset time period, where the first historical temperature and the second historical temperature are a first temperature and a second temperature recorded respectively before and after the historical successful fire extinguishing of all container-type energy storage systems; obtaining a historical fire extinguishing and cooling rate of the corresponding container-type energy storage system based on the first historical temperature and second historical temperature, where the historical fire extinguishing and cooling rate is historical temperature change amount of the target lithium battery cluster per unit time; obtaining the expectation minimum value of the historical fire extinguishing and cooling rate based on the expectation maximization algorithm, and determining the expectation minimum value of the historical fire extinguishing and cooling rate as the preset fire extinguishing and cooling rate threshold.

In one possible embodiment, after shutting down the fire-protection system, the method further includes: continuously obtaining updated first sampling data and determining a third sampling temperature of the target lithium battery cluster after shutting down the fire-protection system based on the updated first sampling data; if the third sampling temperature is less than the first preset temperature threshold and greater than the second preset temperature threshold, determining that the target lithium battery cluster has hardware fault; disconnecting the electrical connection of the target lithium battery cluster and obtain hardware fault information of the target lithium battery cluster; sending hardware fault information and fault alarm information corresponding to the hardware fault information to the display screen for display.

In one possible embodiment, if at least one of the analysis sensors corresponding to the lithium battery cluster malfunctions, determining whether the lithium battery cluster has caught fire based on the third sampling data and the second sampling data, includes: obtaining the third sampling data from the aspirating detectors of at least two adjacent lithium battery clusters of the target lithium battery cluster and the second sampling data from the camera detector, where at least two adjacent lithium battery clusters are located in different directions of the target lithium battery cluster; obtaining the surrounding smoke concentration of at least two adjacent lithium battery clusters based on the third sampling data of the aspirating detectors of at least two adjacent lithium battery clusters; obtain a sampling image of the container-type energy storage system based on the second sampling data from the camera detector; determine whether a risk event occurs in the container-type energy storage system based on sampling image; if it is determined that a risk event occurs in the container-type energy storage system, determining whether the surrounding smoke concentration of each adjacent lithium battery cluster in at least two adjacent lithium battery clusters is greater than a third preset threshold, where the third preset threshold is smaller than the second preset threshold; if the surrounding smoke concentration of at least one of the at least two adjacent lithium battery clusters is greater than the third preset threshold, determining that the target lithium battery cluster has caught fire.

According to a first aspect, there is provided a fire-protection detecting method, applied to a container-type energy storage system, where the container-type energy storage system includes a fire-protection system, a terminal device, and at least one lithium battery cluster, each lithium battery cluster in the at least one lithium battery cluster corresponds to at least two analysis sensors, the at least two analysis sensors include an aspirating detector and an infrared temperature detector, the at least one lithium battery cluster further corresponds to at least one camera detector, where the method comprises: obtaining first sampling data from the infrared temperature detector, second sampling data from the at least one camera detector, and third sampling data from the aspirating detector; determining a first sampling temperature based on the first sampling data, and determining whether a risk event has occurred in the container-type energy storage system based on the first sampling temperature, where the risk event includes the first sampling temperature being greater than a first preset threshold; if it is determined that the risk event has occurred in the container-type energy storage system, determining whether the target lithium battery cluster has caught fire based on the second sampling data from the at least one camera detector and/or the third sampling data from the aspirating detector; if it is determined that the target lithium battery cluster has caught fire, calling the fire-protection system to extinguish fire and sending a first prompt message to the terminal device to prompt that the target lithium battery cluster has caught fire; continuously obtaining updated first sampling data of the target lithium battery cluster, and determining whether to shut down the fire-protection system based on the updated first sampling data.

It can be seen that in the embodiment of the present disclosure, the infrared temperature detector is used to determine whether there is a fire risk in the container-type energy storage system, and the aspirating detector and camera detector are used to determine the specific target lithium battery cluster that has caught fire, which improves the accuracy and efficiency of fire identification of lithium battery cluster in the container-type energy storage system. The infrared temperature detector is used to determine whether the fire has been successfully extinguished, and whether to stop calling the fire-protection system, thereby saving the consumption of fire-extinguishing materials and improving the safety of the energy storage system.

Combining the first aspect, in one possible embodiment, determining whether the target lithium battery cluster has caught fire based on the second sampling data from the at least one camera detector and/or the third sampling data from the aspirating detector includes: obtaining a sampling smoke concentration based on the third sampling data of the aspirating detector; obtaining a sampling image based on the second sampling data from the camera detector; if the sampling smoke concentration is greater than a second preset threshold, and/or if the target lithium battery cluster in the sampling image generates smoke and/or flames, determining that the target lithium battery cluster corresponding to the aspirating detector has caught fire.

It can be seen that in the embodiment of the present disclosure, the specific target lithium battery cluster that malfunctions is determined based on the smoke concentration of the lithium battery cluster and/or the first sampling image, thereby improving the accuracy and efficiency of fire identification of lithium battery cluster, and further improving the safety of the container-type energy storage system.

Combining the first aspect, in one possible embodiment, determining whether to shut down the fire-protection system based on the updated first sampling data includes: determining a second sampling temperature of the target lithium battery cluster based on the updated first sampling data; calculating a fire extinguishing and cooling rate of the target lithium battery cluster based on a first temperature and a second temperature, where the first temperature is a temperature at which the risk event occurred before calling the fire-protection system, the second temperature is the second sampling temperature after calling the fire-protection system, and the fire extinguishing and cooling rate is a temperature change amount of the target lithium battery cluster per unit time; if the second sampling temperature is less than a first preset temperature threshold, and/or if the fire extinguishing and cooling rate of the target lithium battery cluster is greater than a preset fire extinguishing and cooling rate threshold, and temperature does not continue to rise within a preset time range after obtaining the second sampling temperature, shutting down the fire-protection system.

It can be seen that in the embodiment of the present disclosure, it is determined whether to stop calling the fire-protection system to extinguish fire based on the first temperature and the second temperature, and the calling of the fire-protection system to extinguish fire is stopped when the target lithium battery cluster satisfies a predetermined condition, thereby saving the consumption of the fire-extinguishing materials, and further improving the reliability and durability of the fire-protection system.

Combining the first aspect, in one possible embodiment, determining the first preset temperature threshold includes: obtaining current sampling time of the infrared temperature detector; comparing the current sampling time with first preset time, second preset time, and third preset time to obtain a first comparison result, a second comparison result, and a third comparison result, where the first preset time corresponds to a first type preset temperature threshold, the second preset time corresponds to a second type preset temperature threshold, and the third preset time corresponds to a third type preset temperature threshold; setting a first weight value of the first type preset temperature threshold based on the first comparison result, setting a second weight value of the second type preset temperature threshold based on the second comparison result, and setting a third weight value of the third type preset temperature threshold based on the third comparison result; obtaining the first preset temperature threshold by calculating a weighted sum of the first type preset temperature threshold, the second type preset temperature threshold, and the third type preset temperature threshold.

Combining the first aspect, in one possible embodiment, determining the preset fire extinguishing and cooling rate threshold includes: obtaining a first historical temperature and a second historical temperature within a historical preset time period, where the first historical temperature and the second historical temperature are a first temperature and a second temperature recorded respectively before and after historical successful fire extinguishing of all container-type energy storage systems; obtaining a historical fire extinguishing and cooling rate of corresponding container-type energy storage system based on the first historical temperature and the second historical temperature, and the historical fire extinguishing and cooling rate is historical temperature change amount of the target lithium battery cluster per unit time; obtaining an expectation minimum value of the historical fire extinguishing and cooling rate based on an expectation maximization algorithm, and determining the expectation minimum value of the historical fire extinguishing and cooling rate as the preset fire extinguishing and cooling rate threshold.

It can be seen that in the embodiment of the present disclosure, based on the historical preset temperature threshold and historical fire extinguishing and cooling rate of successful fire extinguishing, it is determined whether the target lithium battery cluster has successfully extinguished the fire and whether the calling of the fire-protection system can be stopped. The judgment standards for normal temperature and fire temperature at different time (including different time of one same day or different seasons of the year) are different. The fire extinguishing and cooling rate threshold can be obtained based on different preset temperature thresholds corresponding to different preset time, thereby improving the accuracy of fire detection. In some cases, successful fire extinguishing may also be indicated by rapid cooling of the battery, and whether the target lithium battery cluster has successfully extinguished the fire can be effectively determined, thereby improving the reliability of fire protection in the container-type energy storage system and further reducing the waste of fire-extinguishing materials.

Combining the first aspect, in one possible embodiment, after shutting down the fire-protection system, the method further includes: continuously obtaining the updated first sampling data, and determining a third sampling temperature of the target lithium battery cluster after shutting down the fire-protection system based on the updated first sampling data; if the third sampling temperature is less than the first preset temperature threshold and greater than a second preset temperature threshold, determining that the target lithium battery cluster has hardware fault; disconnecting electrical connection of the target lithium battery cluster and obtaining hardware fault information of the target lithium battery cluster; sending the hardware fault information and fault alarm information corresponding to the hardware fault information to a display screen for display.

It can be seen that in the embodiment of the present disclosure, the connection of the faulty target lithium battery cluster is immediately closed, and the hardware fault information of the lithium battery cluster is obtained and displayed on the display screen together with the fault alarm, improving the efficiency of fire protection and subsequent maintenance of the container-type energy storage system.

Combining the first aspect, in one possible embodiment, if at least one of the analysis sensors corresponding to the lithium battery cluster malfunctions, the method further includes: obtaining third sampling data of aspirating detectors of at least two adjacent lithium battery clusters of the target lithium battery cluster, and the second sampling data from the camera detector, where the at least two adjacent lithium battery clusters are located in different directions of the target lithium battery cluster; obtaining surrounding smoke concentrations of the at least two adjacent lithium battery clusters based on the third sampling data of the aspirating detectors of the at least two adjacent lithium battery clusters; obtaining a sampling image of the container-type energy storage system based on the second sampling data from the camera detector; determining whether a risk event has occurred in the container-type energy storage system based on the sampling image; if it is determined that a risk event has occurred in the container-type energy storage system, determining whether the surrounding smoke concentration of each adjacent lithium battery cluster in the at least two adjacent lithium battery clusters is greater than a third preset threshold, where the third preset threshold is smaller than the second preset threshold; if the surrounding smoke concentration of at least one of the at least two adjacent lithium battery clusters is greater than the third preset threshold, determining that the target lithium battery cluster has caught fire.

It can be seen that in the embodiment of the present disclosure, it can be inferred and analyzed whether the lithium battery cluster with analysis sensor failure has caught fire based on the data collected by analysis sensors of adjacent lithium battery clusters, improving the stability and accuracy of fire-protection detecting in the container-type energy storage system.

According to a second aspect, the embodiment of the present disclosure provides a fire-protection detecting device, applied to a container-type energy storage system, wherein the container-type energy storage system comprises a fire-protection system, a terminal device, and at least one lithium battery cluster, each the lithium battery cluster in the at least one lithium battery cluster corresponds to at least two analysis sensors, the at least two analysis sensors comprise an aspirating detector and an infrared temperature detector, the at least one lithium battery cluster further corresponds to at least one camera detector, wherein the device comprises: an obtaining unit: configured to obtain first sampling data from the infrared temperature detector, second sampling data from the at least one camera detector, and third sampling data of the aspirating detector; a determining unit: configured to determine a first sampling temperature based on the first sampling data, and determining whether a risk event has occurred in the container-type energy storage system based on the first sampling temperature, wherein the risk event comprises that the first sampling temperature is greater than a first preset threshold; if it is determined that the risk event has occurred in the container-type energy storage system, determining whether the target lithium battery cluster has caught fire based on the second sampling data from the at least one camera detector and/or the third sampling data of the aspirating detector; a calling unit: configured to call the fire-protection system to extinguish fire if it is determined that the target lithium battery cluster has caught fire, and send a first prompt message to the terminal device to prompt that the target lithium battery cluster has caught fire; continuously obtain updated first sampling data of the target lithium battery cluster, and determine whether to shut down the fire-protection system based on the updated first sampling data.

According to a third aspect, the embodiment of the present disclosure provides an electronic device, comprising a processor, a memory, a communication interface, and one or more programs, where the one or more programs are stored in the memory and configured to be executed by the processor, one or more instructions are suitable to be loaded by the processor and a part or all of the method according to the first aspect is performed.

According to a fourth aspect, the embodiment of the present disclosure provides a computer-readable storage medium, wherein the computer-readable storage medium stores a computer program for electronic data exchange, wherein the computer program causes a computer to execute a part or all of the method according to the first aspect.

It should be noted that for the sake of simple description, each of the aforementioned method embodiments is expressed as a series of action combinations. However, those skilled in the art should be aware that this disclosure is not limited by the described action sequence, and certain steps can be performed in other sequences or simultaneously according to the present disclosure. Secondly, those skilled in the art should also be aware that the embodiments described in the specification are all preferred embodiments, and the actions and modules involved may not be necessary for the present disclosure.

In the above embodiments, the description of each embodiment has its own emphasis. For the parts that are not detailed in one embodiment, please refer to the relevant descriptions of other embodiments.

In the several embodiments provided in the present disclosure, it should be understood that the disclosed device can be implemented in other ways. For example, the device embodiments described above are only schematic, such as the division of the units, which is only a logical functional division. In actual implementation, there may be other division methods. For example, multiple units or components can be combined or integrated into another system, or some features can be ignored or not executed. On the other hand, the coupling or direct coupling or communication connection between the displayed or discussed devices or units can be indirect coupling or communication connection through some interfaces, and can be in the form of electricity or other forms.

The units described as separate components may be physically separated or may not be physically separated. The components displayed as units may be physical units or may not be physical units, that is, they can be located in one place or distributed across multiple network units. Some or all of the units can be selected according to actual needs to achieve the purpose of this embodiment.

In addition, in various embodiments of the present disclosure, each functional unit can be integrated into a single processing unit, or each unit can physically exist separately, or two or more units can be integrated into one unit. The integrated units mentioned above can be implemented in both hardware and software functional units.

If the integrated unit is implemented in the form of a software functional unit and sold or used as an independent product, it can be stored in a computer readable memory. Based on this understanding, the technical solution of the present disclosure, in essence, or the portion that contributes to the prior art, or all or part of the technical solution, can be reflected in the form of a software product, which is stored in a memory, including several instructions to enable a computer device (which can be a personal computer, server, or network device, etc.) to perform all or part of the steps of the methods described in various embodiments of the present disclosure. The aforementioned memory includes various media that can store program code, such as USB flash drive, Read Only Memory (ROM), Random Access Memory (RAM), removable hard drive, magnetic disk, or optical disc.

Those skilled in the art can understand that all or part of the steps in the various methods of the above embodiments can be performed by instructing the relevant hardware through a program. The program can be stored in a computer readable memory. The memory can include: flash drive, Read Only Memory (ROM), Random Access Memory (RAM) Disk or optical disc, etc.

As mentioned above, the above embodiments are only used to illustrate the technical solution of the present disclosure and not to limit it. Although the present disclosure has been described in detail with reference to the aforementioned embodiments, those skilled in the art should understand that they can still modify the technical solutions recorded in the aforementioned embodiments or equivalently replace some of the technical features. These modifications or replacements do not make the essence of the corresponding technical solutions deviate from the scope of the technical solutions of the various embodiments of the present disclosure.

What is claimed is:

1. An electronic device, applied to a container-type energy storage system, wherein the container-type energy storage system comprises a fire-protection system, a terminal device, and at least one lithium battery cluster, each of the at least one lithium battery cluster corresponds to at least two analysis sensors, the at least two analysis sensors comprise an aspirating detector and an infrared temperature detector, the at least one lithium battery cluster further corresponds to at least one camera detector, the electronic device comprises a processor, a memory, a communication interface, and one or more programs, wherein the one or more programs are stored in the memory and configured to be executed by the processor, the program comprises instructions for executing the following steps:

obtaining first sampling data from the infrared temperature detector, second sampling data from the at least one camera detector, and third sampling data from the aspirating detector;

determining a first sampling temperature based on the first sampling data, and determining, based on the first sampling temperature, whether a risk event has occurred in the energy storage container system, wherein the risk event comprises the first sampling temperature being greater than a first preset threshold;

if it is determined that the risk event has occurred in the container-type energy storage system, determining whether a target lithium battery cluster has caught fire based on the second sampling data from the at least one camera detector and/or the third sampling data from the aspirating detector, wherein determining whether the target lithium battery cluster has caught fire comprises: obtaining a sampling smoke concentration based on the third sampling data of the aspirating detector; obtaining a sampling image based on the second sampling data of the camera detector; if the sampling smoke concentration is greater than a second preset threshold, and/or if the target lithium battery cluster in the sampling image generates at least one of smoke and flames, determining that the target lithium battery cluster corresponding to the aspirating detector has caught fire;

if it is determined that the target lithium battery cluster has caught fire, calling the fire-protection system to extinguish fire and sending a first prompt message to the terminal device to prompt that the target lithium battery cluster has caught fire;

continuously obtaining updated first sampling data of the target lithium battery cluster, and determining whether to shut down the fire-protection system based on the updated first sampling data, wherein determining whether to shut down the fire-protection system comprises: determining a second sampling temperature of the target lithium battery cluster based on the updated first sampling data; calculating a fire extinguishing and cooling rate of the target lithium battery cluster based on a first temperature and a second temperature, wherein the first temperature is a temperature at which the risk event occurred before calling the fire-protection system, the second temperature is the second sampling temperature after calling the fire-protection system, and the fire extinguishing and cooling rate is a temperature change amount of the target lithium battery cluster per unit time; if the second sampling temperature is less than a first preset temperature threshold, and if the fire extinguishing and cooling rate of the target lithium battery cluster is greater than a preset fire extinguishing and cooling rate threshold, and temperature does not continue to rise within a preset time range after obtaining the second sampling temperature, shutting down the fire-protection system.

2. The device according to claim 1 wherein determining the first preset temperature threshold comprises:

obtaining current sampling time of the infrared temperature detector;

comparing the current sampling time with first preset time, second preset time, and third preset time to obtain a first comparison result, a second comparison result, and a third comparison result, wherein the first preset time corresponds to a first type preset temperature threshold, the second preset time corresponds to a second type preset temperature threshold, and the third preset time corresponds to a third type preset temperature threshold;

setting a first weight value of the first type preset temperature threshold based on the first comparison result, setting a second weight value of the second type preset temperature threshold based on the second comparison result, and setting a third weight value of the third type preset temperature threshold based on the third comparison result;

obtaining the first preset temperature threshold by calculating a weighted sum of the first type preset temperature threshold, the second type preset temperature threshold, and the third type preset temperature threshold.

3. The device according to claim 2, wherein if at least one of the analysis sensors corresponding to the lithium battery cluster malfunctions, the program further comprises instructions for executing the following steps:

obtaining third sampling data from aspirating detectors of at least two adjacent lithium battery clusters of the target lithium battery cluster, and the second sampling data from the camera detector, wherein the at least two adjacent lithium battery clusters are located respectively in different directions of the target lithium battery cluster;

obtaining surrounding smoke concentrations of the at least two adjacent lithium battery clusters based on the third sampling data of the aspirating detectors of the at least two adjacent lithium battery clusters;

obtaining a sampling image of the container-type energy storage system based on the second sampling data of the camera detector;

determining, based on the sampling image, whether a risk event has occurred in the container-type energy storage system;

if it is determined that the risk event has occurred in the container-type energy storage system, determining whether the surrounding smoke concentration of each adjacent lithium battery cluster in the at least two adjacent lithium battery clusters is greater than a third preset threshold, wherein the third preset threshold is smaller than the second preset threshold;

if the surrounding smoke concentration of at least one of the at least two adjacent lithium battery clusters is greater than the third preset threshold, determining that the target lithium battery cluster has caught fire.

4. The device according to claim 1, wherein determining the preset fire extinguishing and cooling rate threshold comprises:

obtaining a first historical temperature and a second historical temperature within a historical preset time period, wherein the first historical temperature and the second historical temperature are a first temperature and a second temperature recorded respectively before and after historical successful fire extinguishing of all container-type energy storage systems;

calculating a historical fire extinguishing and cooling rate of corresponding container-type energy storage system based on the first historical temperature and the second historical temperature, wherein the historical fire extinguishing and cooling rate is historical temperature change amount of the target lithium battery cluster per unit time;

calculating an expectation minimum value of the historical fire extinguishing and cooling rate based on an expectation maximization algorithm, and determining the expectation minimum value of the historical fire extinguishing and cooling rate as the preset fire extinguishing and cooling rate threshold.

5. The device according to claim 4, wherein after shutting down the fire-protection system, the program further comprises instructions for executing the following steps:
continuously obtaining the updated first sampling data, and determining, based on the updated first sampling data, a third sampling temperature of the target lithium battery cluster after shutting down the fire-protection system; if the third sampling temperature is less than the first preset temperature threshold and greater than a second preset temperature threshold, determining that the target lithium battery cluster has hardware fault;
disconnecting electrical connection of the target lithium battery cluster and obtaining hardware fault information of the target lithium battery cluster;
sending the hardware fault information and fault alarm information corresponding to the hardware fault information to a display screen for display.

6. The device according to claim 5, wherein if at least one of the analysis sensors corresponding to the lithium battery cluster malfunctions, the program further comprises instructions for executing the following steps:
obtaining third sampling data from aspirating detectors of at least two adjacent lithium battery clusters of the target lithium battery cluster, and the second sampling data from the camera detector, wherein the at least two adjacent lithium battery clusters are located respectively in different directions of the target lithium battery cluster;
obtaining surrounding smoke concentrations of the at least two adjacent lithium battery clusters based on the third sampling data of the aspirating detectors of the at least two adjacent lithium battery clusters;
obtaining a sampling image of the container-type energy storage system based on the second sampling data of the camera detector;
determining, based on the sampling image, whether a risk event has occurred in the container-type energy storage system;
if it is determined that the risk event has occurred in the container-type energy storage system, determining whether the surrounding smoke concentration of each adjacent lithium battery cluster in the at least two adjacent lithium battery clusters is greater than a third preset threshold, wherein the third preset threshold is smaller than the second preset threshold;
if the surrounding smoke concentration of at least one of the at least two adjacent lithium battery clusters is greater than the third preset threshold, determining that the target lithium battery cluster has caught fire.

7. The device according to claim 4, wherein if at least one of the analysis sensors corresponding to the lithium battery cluster malfunctions, the program further comprises instructions for executing the following steps:
obtaining third sampling data from aspirating detectors of at least two adjacent lithium battery clusters of the target lithium battery cluster, and the second sampling data from the camera detector, wherein the at least two adjacent lithium battery clusters are located respectively in different directions of the target lithium battery cluster;
obtaining surrounding smoke concentrations of the at least two adjacent lithium battery clusters based on the third sampling data of the aspirating detectors of the at least two adjacent lithium battery clusters;
obtaining a sampling image of the container-type energy storage system based on the second sampling data of the camera detector;
determining, based on the sampling image, whether a risk event has occurred in the container-type energy storage system
if it is determined that the risk event has occurred in the container-type energy storage system, determining whether the surrounding smoke concentration of each adjacent lithium battery cluster in the at least two adjacent lithium battery clusters is greater than a third preset threshold, wherein the third preset threshold is smaller than the second preset threshold;
if the surrounding smoke concentration of at least one of the at least two adjacent lithium battery clusters is greater than the third preset threshold, determining that the target lithium battery cluster has caught fire.

8. The device according to claim 1, wherein if at least one of the analysis sensors corresponding to the lithium battery cluster malfunctions, the program further comprises instructions for executing the following steps:
obtaining third sampling data from aspirating detectors of at least two adjacent lithium battery clusters of the target lithium battery cluster, and the second sampling data from the camera detector, wherein the at least two adjacent lithium battery clusters are located respectively in different directions of the target lithium battery cluster;
obtaining surrounding smoke concentrations of the at least two adjacent lithium battery clusters based on the third sampling data of the aspirating detectors of the at least two adjacent lithium battery clusters;
obtaining a sampling image of the container-type energy storage system based on the second sampling data of the camera detector;
determining, based on the sampling image, whether a risk event has occurred in the container-type energy storage system;
if it is determined that the risk event has occurred in the container-type energy storage system, determining whether the surrounding smoke concentration of each adjacent lithium battery cluster in the at least two adjacent lithium battery clusters is greater than a third preset threshold, wherein the third preset threshold is smaller than the second preset threshold;
if the surrounding smoke concentration of at least one of the at least two adjacent lithium battery clusters is greater than the third preset threshold, determining that the target lithium battery cluster has caught fire.

9. A non-transitory computer-readable storage medium, applied to a container-type energy storage system, wherein the container-type energy storage system comprises a fire-protection system, a terminal device, and at least one lithium battery cluster, each of the at least one lithium battery cluster corresponds to at least two analysis sensors, the at least two analysis sensors comprise an aspirating detector and an infrared temperature detector, the at least one lithium battery cluster further corresponds to at least one camera detector, wherein the computer-readable storage medium stores a computer program for electronic data exchange, wherein the computer program causes a computer to execute the following steps:

obtaining first sampling data from the infrared temperature detector, second sampling data from the at least one camera detector, and third sampling data from the aspirating detector;

determining a first sampling temperature based on the first sampling data, and determining, based on the first sampling temperature, whether a risk event has occurred in the energy storage container system, wherein the risk event comprises the first sampling temperature being greater than a first preset threshold;

if it is determined that the risk event has occurred in the container-type energy storage system, determining whether a target lithium battery cluster has caught fire based on the second sampling data from the at least one camera detector and/or the third sampling data from the aspirating detector, wherein determining whether the target lithium battery cluster has caught fire comprises: obtaining a sampling smoke concentration based on the third sampling data of the aspirating detector; obtaining a sampling image based on the second sampling data of the camera detector; if the sampling smoke concentration is greater than a second preset threshold, and/or if the target lithium battery cluster in the sampling image generates at least one of smoke and flames, determining that the target lithium battery cluster corresponding to the aspirating detector has caught fire;

if it is determined that the target lithium battery cluster has caught fire, calling the fire-protection system to extinguish fire and sending a first prompt message to the terminal device to prompt that the target lithium battery cluster has caught fire;

continuously obtaining updated first sampling data of the target lithium battery cluster, and determining whether to shut down the fire-protection system based on the updated first sampling data, wherein determining whether to shut down the fire-protection system comprises: determining a second sampling temperature of the target lithium battery cluster based on the updated first sampling data; calculating a fire extinguishing and cooling rate of the target lithium battery cluster based on a first temperature and a second temperature, wherein the first temperature is a temperature at which the risk event occurred before calling the fire-protection system, the second temperature is the second sampling temperature after calling the fire-protection system, and the fire extinguishing and cooling rate is a temperature change amount of the target lithium battery cluster per unit time; if the second sampling temperature is less than a first preset temperature threshold, and if the fire extinguishing and cooling rate of the target lithium battery cluster is greater than a preset fire extinguishing and cooling rate threshold, and temperature does not continue to rise within a preset time range after obtaining the second sampling temperature, shutting down the fire-protection system.

10. The non-transitory computer-readable storage medium according to claim 9, wherein determining the first preset temperature threshold comprises:

obtaining current sampling time of the infrared temperature detector;

comparing the current sampling time with first preset time, second preset time, and third preset time to obtain a first comparison result, a second comparison result, and a third comparison result, wherein the first preset time corresponds to a first type preset temperature threshold, the second preset time corresponds to a second type preset temperature threshold, and the third preset time corresponds to a third type preset temperature threshold;

setting a first weight value of the first type preset temperature threshold based on the first comparison result, setting a second weight value of the second type preset temperature threshold based on the second comparison result, and setting a third weight value of the third type preset temperature threshold based on the third comparison result;

obtaining the first preset temperature threshold by calculating a weighted sum of the first type preset temperature threshold, the second type preset temperature threshold, and the third type preset temperature threshold.

11. The non-transitory computer-readable storage medium according to claim 9, wherein determining the preset fire extinguishing and cooling rate threshold comprises:

obtaining a first historical temperature and a second historical temperature within a historical preset time period, wherein the first historical temperature and the second historical temperature are a first temperature and a second temperature recorded respectively before and after historical successful fire extinguishing of all container-type energy storage systems;

calculating a historical fire extinguishing and cooling rate of corresponding container-type energy storage system based on the first historical temperature and the second historical temperature, wherein the historical fire extinguishing and cooling rate is historical temperature change amount of the target lithium battery cluster per unit time;

calculating an expectation minimum value of the historical fire extinguishing and cooling rate based on an expectation maximization algorithm, and determining the expectation minimum value of the historical fire extinguishing and cooling rate as the preset fire extinguishing and cooling rate threshold.

12. The non-transitory computer-readable storage medium according to claim 11, wherein after shutting down the fire-protection system, the computer program further causes the computer to execute the following steps:

continuously obtaining the updated first sampling data, and determining, based on the updated first sampling data, a third sampling temperature of the target lithium battery cluster after shutting down the fire-protection system if the third sampling temperature is less than the first preset temperature threshold and greater than a second preset temperature threshold, determining that the target lithium battery cluster has hardware fault;

disconnecting electrical connection of the target lithium battery cluster and obtaining hardware fault information of the target lithium battery cluster;

sending the hardware fault information and fault alarm information corresponding to the hardware fault information to a display screen for display.

* * * * *